Figure 1:
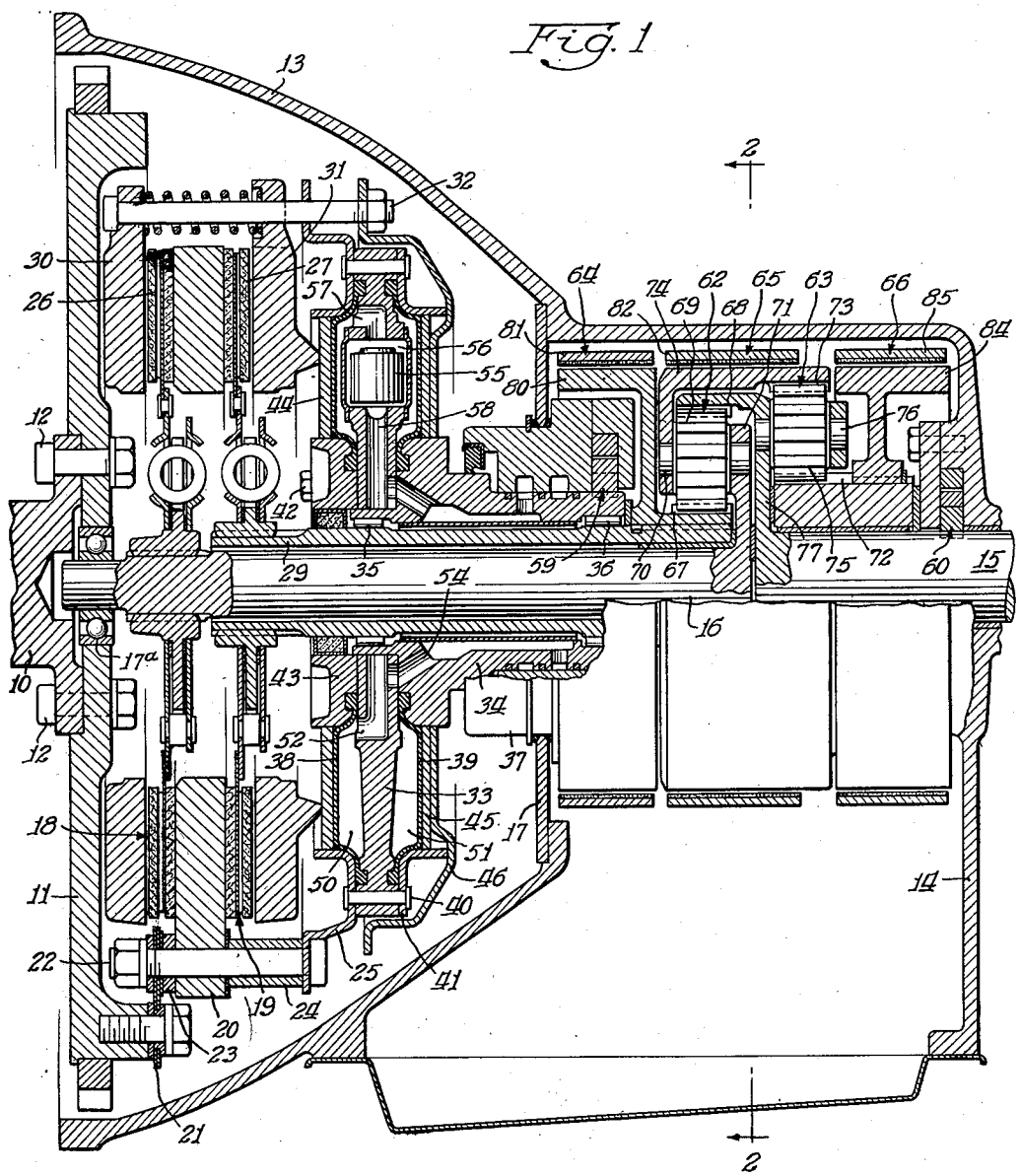

Dec. 9, 1952 R. L. SMIRL 2,620,685
TRANSMISSION
Filed May 11, 1948 2 SHEETS—SHEET 1

Inventor:
Richard L. Smirl
By Edward C. Dietz ...
Atty.

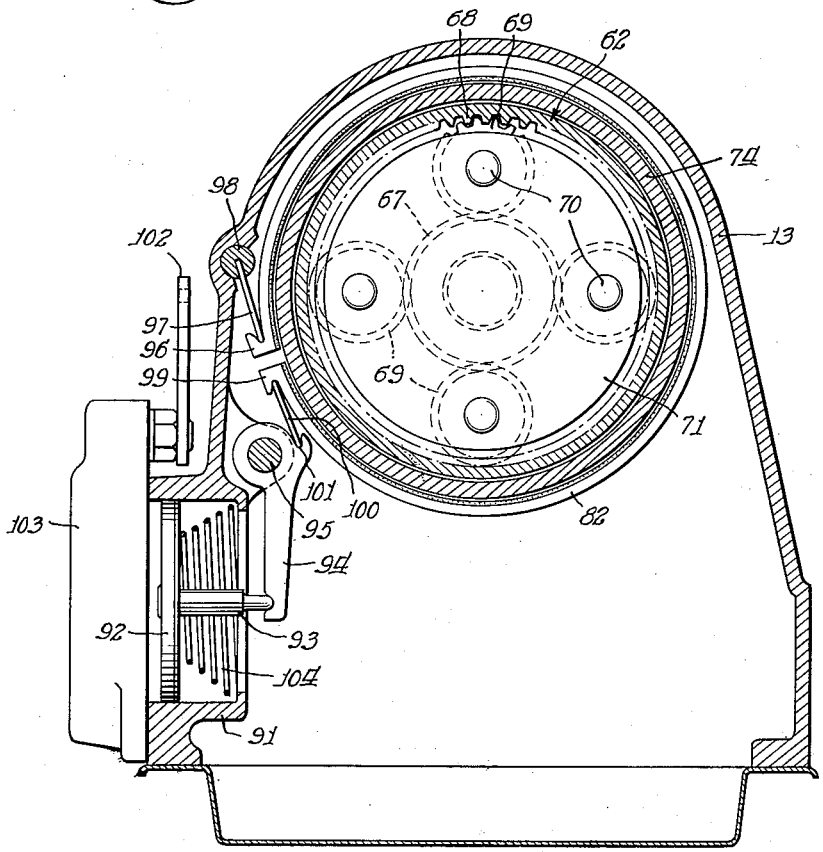

Patented Dec. 9, 1952

2,620,685

UNITED STATES PATENT OFFICE 2,620,685

TRANSMISSION

Richard L. Smirl, La Grange, Ill., assignor to Borg-Warner Corporation, Chicago, Ill., a corporation of Illinois Application May 11, 1948, Serial No. 26,389

1 Claim. (Cl. 74—752)

This invention relates to variable speed transmissions and more particularly to such transmissions adapted for use in motor vehicles, although suitable for other purposes.

An object of the invention is to provide a variable speed transmission affording multiple torque paths between power and load and in which coupling devices are selectively operable to effect transition between the paths.

Another object of the invention is to provide a transmission having a novel arrangement of friction coupling devices and gearing which provide dual selective coupling means to the power-providing element for the establishment of low speed ratio and overspeed ratio driving of the load and which provide direct drive by compound coupling of both the devices.

A further object of the invention is to provide an improved transmission embodying planetary gearing adapted to provide four forward variable speed ratio and reverse drives in cooperation with a plurality of coupling devices for connecting one or more elements of the gearing to the power-providing element to effect such drives.

Another object of the invention is to provide a planetary transmission embodying a plurality of clutches affording split torque paths between the planetary gearing and power-providing element for selectively transmitting drive to one or more elements of the gearing, and a plurality of brake devices for controlling the gearing to provide a plurality of forward variable speed ratio and reverse drives of the load.

A further object of the invention is to provide a change-speed-mechanism and transmission embodying a plurality of fluid-actuated clutches selectively operable to connect the power to the mechanism to thereby provide two parallel torque paths therebetween, one of said clutches being speed-responsive to connect the power through the mechanism to the load for affording a smooth and gradual drive of the load in the transition from one speed ratio to another.

A further object of the invention is to provide an improved transmission employing planetary gearing adapted to provide a plurality of forward variable speed ratios including overdrive speed ratio, and a pair of friction clutches selectively engageable to transmit drive from the drive shaft of the transmission to the gearing in the overdrive and underdrive speed ratio conditions thereof.

My novel transmission utilizes two friction clutches and two sets of simple planetary gearing affording four forward variable speed ratios and reverse drive thereby providing a compact arrangement which occupies less space than that required for a standard gear transmission offering similar speed ratios and reverse drive. These and other objects and advantages will appear as I proceed with the description of the embodiment of the invention, which, for purposes of the present application, I have illustrated in the accompanying drawings, in which:

Fig. 1 is a longitudinal sectional view of the transmission assembly embodying my invention; and Fig. 2 is a section of the structure of Fig. 1 taken along line 2—2 of Fig. 1, showing the actuating mechanism for one of the brake devices, which is equivalent to similar mechanism utilized to actuate the other brake devices shown in Fig. 1.

Referring now to the drawings for a more detailed description of the invention, 10 is the crankshaft of an engine which also constitutes the drive or input shaft of the transmission. The drive shaft 10 has a radially extending flange connected to a flywheel 11 by bolts 12, 12. The engine is provided with usual crankshaft housing (not shown) and to said housing is secured a combined clutch and transmission housing 13. The housing 13 is provided with a transverse end wall 14 rotatably mounting the driven or output shaft 15. Intermediate the drive shaft 10 and driven shaft 15 is a shaft 16 supported in axial alignment with the shafts 10 and 15 by elements mounted on a transverse wall 17 of the housing as described hereinafter and also by ball bearings 17a disposed in the flywheel 11 and piloting the forward end of the shaft 16.

Secured to the flywheel 11 is a multiple clutch assembly consisting of two friction clutches 18 and 19 capable of selective and conjoint operation. The clutch assembly comprises a driving member or pressure plate 20 which is supported from and driven by the flywheel 11 through flexible metallic straps 21 secured to the flywheel through the medium of bolt and nut assemblies, one of which is shown at 22, each assembly 22 comprising a bolt extending through the plate 20, bushings 23 and 24 on opposite sides of the plate 20, straps 21, and cover plate 25, the straps 21 connecting the plate 20 to the flywheel and restraining the plate against axial movement. Disposed on opposite sides of the plate 20 are the driven clutch plates 26 and 27, the plate 26 of the clutch 18 having its hub portion splined to the intermediate shaft 16 and the plate 27 having its hub portion splined to a hollow sleeve 29 surrounding the shaft 16 and rotatable relative thereto. The friction facings of the clutch plate 26 are interposed and are adapted to be clamped between the plate 20 and a pressure plate 30 to impart drive from the input shaft 10 to the shaft 16, and similarly, the friction facings of the clutch plate 27 are disposed and may be clamped between the plate 20 and pressure plate 31 to drive the sleeve shaft 29. The pressure plates 30 and 31 are carried on a plurality of bolt and nut assemblies, one of which is shown at 32, connected to the cover plate 25 and the flywheel, in such manner that they are held concentric and will rotate with the cover plate and flywheel but are free to be moved longitudinally by a spring on each bolt out of engagement with the clutch plates 26 and 27 and also to be moved into engagement with the clutch plates by the application of pressure to the drive plates 30 and 31, respectively, by fluid pressure actuating means now to be described.

The clutches 18 and 19 are adapted to be selectively engaged by fluid-pressure actuated mechanism and, for this purpose, the cover plate 25 has bolted thereto a diaphragm plate 33 whose hub 34 is piloted on the sleeve 29 by roller bearings 35 and 36. The hub 34 extends through and is rotatably mounted on an annular collar 37 extending within an opening in the central wall 17 of the housing 13 and fixed to said wall. It will be apparent that the clutch member 20, cover plate 25, diaphragm plate 33, and hub 34 thus form an assembled unit secured at one end to the flywheel and rotatably mounted at its other end in the collar 37. Disposed on opposite sides of the diaphragm plate 33 are annular flexible diaphragms 38 and 39 having their outer peripheries clamped to the plate 33 by rivets 40 extending through the cover plate 25, diaphragm plate 33 and a clamping ring 41, the inner peripheries of the diaphragm being clamped to the plate 33 by bolts 42 extending through an annular clamping member 43 and threaded into the hub 34 of the plate 33. The diaphragm 38 is engaged with a piston 44 laterally displaceable by the diaphragm to cause movement of the pressure plate 31 to clamp the driven clutch plate 27 of the clutch 19 between the plate 31 and driving plate 26 to effect rotation of the plate 27 and the sleeve shaft 29 by the drive plate 31. The diaphragm 39 has similarly associated therewith a piston 45 for actuating an engaged plate 46 slidably connected to the bolts of the nut and bolt assemblies 32 and operative through its engagement with the nuts of said assemblies to impart movement to the assemblies and the pressure plate 30 to effect engagement of the clutch 18. It will thus be seen that the clutches 18 and 19 can be conjointly or selectively engaged by actuation of the clutch pistons 44 and 45.

It may be noted that the diaphragm plate 33 and diaphragms 38 and 39 define fluid chambers 50 and 51. For the purpose of conducting pressure fluid to the chamber 50 to actuate the piston 44 to engage clutch 19, a passage 52 in the plate 33 communicates with the chamber 50 and a passage 54 in the rotating hub 34 of the diaphragm plate 33, the latter passage being connected with a source of fluid pressure, to be described, by suitable control means. Pressure fluid can also be transmitted to the chamber 51 through a passageway (not shown) in the hub 34 of the plate 33 communicating with a source of fluid pressure under the control of a valve or other control means. Actuation of the piston 44 and engagement of clutch 19 by pressure fluid in the chamber 50 is controlled by a centrifugal-weight valve 55 disposed within a chamber 56 in the diaphragm plate 33 and adapted to be urged towards the axis of rotation of the plate 33 upon pressure fluid entering the chamber 50 and passing through a passage 57 communicating with the chamber 56, the valve 55 permitting the pressure fluid to flow there-around and into drain passage 58 in the plate 33 so that pressure will be unable to build up in the chamber 50 to effect actuation of the piston 44. However, pressure can be built up on the diaphragm 38 to actuate the piston 44 to engage clutch 19 when the engine speed is sufficient to effect movement of the valve radially outward of the axis of rotation of the diaphragm plate so that the valve offers resistance to the flow of the pressure fluid from the passage 57 to the drain passage 58. The clutch 19 is thus speed-responsive and will connect the motor to the load in a smooth and gradual manner during transition from one speed ratio to another, as will be later described.

For the purpose of providing fluid under pressure to actuate the pistons 44 and 45, the transmission is provided with two pumps generally indicated 59 and 60, the first pump 59 being driven through the medium of the extended hub 34 of the diaphragm plate 33, cover plate 25, drive plate 26, and flywheel 11 connected to the engine crankshaft 10, this assembly being operatively connected together to effect operation of the pump whenever the engine is operating. The rear pump 60 is driven by the output shaft 15 and can be utilized, in the event the engine will not start, to provide fluid pressure for operating the clutches when the driven shaft is rotated by pushing or towing the vehicle.

The change speed mechanism of the transmission comprises a pair of planet gear sets generally indicated 62 and 63 adapted to be controlled by three fluid-pressure actuated brake devices 64, 65 and 66, for providing four forward speed ratios and reverse drive. The planet gear set 62 comprises a sun gear 67 splined to the adjacent end of the sleeve shaft 29, a ring gear 68, a series of planet pinions 69 meshing with the sun and ring gears 67 and 68 and rotatably mounted on stub shafts 70, fixed to the planet carrier indicated at 71 and comprising a radially extending flange on the shaft 16. The planet gear set 63 comprises a sun gear 72 rotatably mounted on the driven shaft 15; a ring gear 73 provided on drum 74, supporting the stub shafts 70 and thereby forming part of the carrier 71; and a series of planet pinions 75 rotatably mounted on stub shafts 76 fixed to a carrier 77 coupled to the output shaft 15 and connected to the ring gear 68 of the gear set 62.

Referring to the brake devices 64, 65, and 66 controlling the planetary gear sets 62 and 63 to provide the various speed ratios and reverse drive, the brake device 64 comprises a drum 80 coupled to the sun gear 67 of the gear set 62 and adapted to have applied thereto a brake band 81 to prevent rotation of the sun gear which thus provides a reaction point for the establishment of overdrive speed ratio. The brake device 65 is adapted to hold stationary the carrier 71 of the gear set 62 and also the ring gear of the gear set 63 to provide reverse drive and comprises the drum 74 coupled to the ring gear 73 and carrier 71, and a brake band 82 engageable with the drum 74. The brake device 66 comprises a drum 84 splined to the sun gear 72 of the gear set 63 and adapted to be engaged by brake band 85 for holding the sun gear against rotation to provide a reaction point for the establishment of first and second or underdrive speed ratios.

To control the brake bands 81, 82 and 85, the bands have associated therewith brake-applying devices, one of which is shown in Fig. 2. Each of these devices is similar in structure and operative in an identical manner and, therefore, the device associated with the brake 65 comprising band 82 will only be described. As shown in Fig. 2, a cylinder 91 is formed integral with the housing 13, and a piston 92 in the cylinder 91 has its piston rod 92 extending outwardly of the cylinder and pivotally connected to the extremity of a lever 94 pivoted on a pin 95 supported by a boss on the casing 13 and adapted to actuate the brake band 82 into engagement with the drum 74 to prevent rotation thereof. For this purpose, the brake band surrounds the drum 74, and the anchor end 96 of the brake band 82 is provided with a notch receiving one end of a link or strut 97 having its other end extending within a member 98 rotatably mounted in the casing 13, and the other end 99 of the brake band 82 being provided with a notch receiving a thrust link or strut 100 extending within and having engagement with a notch 101 in the lever 94. The piston 92 is actuated by fluid pressure through the medium of a lever 102 which is suitably connected to a valve arrangement in the control device 103, fixed to the casing 13, for admitting fluid pressure into the cylinder 91 and thereby the application of fluid pressure to the piston 92. The piston 92 will be moved by the pressure fluid against the pressure exerted thereon by a spring 104 in the cylinder 91 and seated against a cylindrical flange of the cylinder defining the opening in the cylinder through which the piston rod 93 extends, and the piston 92 will thereby effect actuation of the piston rod 93 to rotate the lever 94 about its pivot 95 in a counter-clockwise direction and move the thrust link 100 to cause the band 82 to grip the brake drum 74 to prevent rotary movement thereof. To relieve the fluid pressure for disengagement of the brake, the lever 102 can be operated to close the admission of pressure fluid from the device 103 to the cylinder 91 and to open a drain passage in the device 103 so that the spring 104 will be effective to move the piston 92 to the left and thereby rotate the lever 94 in a clockwise direction to effect the release of the brake band 82 from the brake drum 74.

Describing the operation of the transmission, it will be assumed that the operator is in control of the fluid pressure directing systems for effecting actuation of the clutches 18 and 19 and the brake devices 64, 65 and 66. At this time, the controls for operating the clutches and brake devices have not been actuated by the operator and, therefore, a neutral condition of the transmission will exist.

To obtain first or low speed ratio, fluid under pressure is directed to the fluid chamber 50, and the engine is accelerated to effect radially outward movement of the valve body 55 by centrifugal force to close the passage 57 to build up fluid pressure in the chamber 50 to effect actuation of the diaphragm 38 and thereby piston 44 to move the pressure plate 31 to clamp the friction facings of the plate 27 between the pressure plates 29 and 31. With the clutch 19 engaged, the drive will be transmitted to the sleeve shaft 29. The brake device 66 is then engaged to hold the sun gear 72 against rotation to provide a reaction point for establishing low speed ratio. With the sun gear 72 held stationary, drive will be transmitted from the sleeve shaft 29 and to the sun gear 67 fixed thereto, planet pinions 69, and ring gear 68 to effect rotation of the driven shaft 15 at low speed.

To provide second speed ratio, the brake device 66 is maintained in operative condition, the clutch 19 is released, and the clutch 18 engaged. It will be apparent that, when pressure fluid is prevented from flowing to the chamber 50 by the operator, the fluid pressure in the chamber 50 may be released to effect disengagement of the clutch 19 through the passages 52 and 54, even though the centrifugal weight valve 55 is effective to close the passage 57. At this time, pressure is directed to the chamber 51, and the diaphragm 39 will expand to force the piston 45 against the plate 46 which will be urged to the right to engage the pressure plate 30 with the friction clutch facings of the clutch plate 26 of the clutch 18 to clamp these facings between the pressure plate 30 and 20 to impart drive from the crankshaft 10 to the shaft 16. With drive being transmitted from the shaft 10 to the shaft 16, the carrier 71 is rotated. As the brake 66 is operative, the sun gear 72 will be effective to establish a reaction causing the ring gear 68 and driven shaft 15 to rotate forwardly in second speed ratio.

Third speed ratio or direct drive is provided by releasing the brake device 66 and engaging the clutch 19 so that both of the clutches 18 and 19 will be engaged. In this condition of the transmission, it will be apparent that the shafts 29 and 16 will rotate in unison and effect rotation of the sun gear 67 and carrier 71 of the planet gear set 62 so that the gear set 62 will be locked up and, accordingly, the ring gear 68 thereof and the driven shaft 15 will be driven at the same speed as that of the drive shaft 10.

To obtain fourth speed ratio or overdrive, clutch 19 is disengaged, clutch 18 remains engaged, and brake device 64 is engaged to hold the drum 80 and thereby sun gear 67 of the gear set 62 stationary to provide a reaction point for conditioning the planetary gear set 62 to effect drive of the driven shaft 15 at a speed greater than that of the drive shaft 10 or in an overdrive speed ratio. With the drive shaft 10, clutch 18, shaft 16, and thereby the carrier 71 of the gear set 62 being rotated at the same speed, it will be apparent that the stationary sun gear 67 is effective to cause the ring gear 68 and thereby the driven shaft 15 to be rotated at an overdrive speed.

To obtain reverse drive, the clutch 19 is engaged and the brake device 65 is also operated to hold the drum 74 and planet carrier 71 against rotation. Drive will be transmitted from the drive shaft 10 through the engaged clutch 19 to the sleeve shaft 29 connected to the sun gear 67 and, as the planet carrier 71 is stationary, forward rotation of the sun gear 67 will cause the planet pinion 69 to rotate the ring gear 68 and thereby the driven shaft 15 in a direction opposite to that of the direction of rotation of the drive shaft 10.

It will be apparent from the foregoing description of the transmission that this transmission is extremely flexible in effecting changes of speed ratio inasmuch as the transition successively from initial or low speed ratio to second, third, and fourth speed ratios is effected by merely engaging or releasing one of the clutches or one of the brake bands as will be apparent from an inspection of the following actuation pattern of the clutch and brake elements designated and in which the letter "$x$" designates engagement of the clutch or brake noted:

|  | Clutch 18 | Clutch 19 | Band 85 | Band 82 | Band 81 |
|---|---|---|---|---|---|
| Low |  | x | x |  |  |
| Second | x |  | x |  |  |
| Third or Direct Drive | x | x |  |  |  |
| Fourth or Overdrive | x |  |  |  | x |
| Reverse |  | x |  | x |  |

To initiate movement of the vehicle, clutch 19 and brake band 85 are engaged. Thereafter, to establish second speed ratio, it is only necessary to engage the clutch 18 while disengaging the clutch 19. Third speed ratio or direct drive is then easily obtained by releasing the brake band 85 while engaging the clutch 19. To change from third speed ratio to fourth speed ratio or overdrive, the clutch 19 is disengaged and brake band 81 is engaged. It will thus be apparent that a simple ratio changing schedule is provided requiring operation of only one of the clutches or one of the brake devices to effect the transition from one speed ratio to the next succeeding speed ratio. Furthermore, the clutches and brake devices, controlling the transmission, permit downshifting of the transmission in a simple and ready manner from second, third or fourth speed to the next lower speed ratio. Referring to the above noted shift pattern, it will be noted that by simply releasing the brake band 81 and engaging the brake band 85 the transmission may be downshifted from overdrive to second speed, and the downshift from third speed ratio or direct drive to second speed ratio is quickly effected by disengaging clutch 19 and engaging brake band 85. It will thus be seen I have provided a novel and improved transmission capable of meeting any of the driving conditions which the driver of the automotive vehicle may encounter and where it is required to effect transition from one of the speed ratios to another speed ratio according to the demand of the operator.

One very important feature resides in the provision of a speed-responsive fluid-actuated clutch in the establishment of first speed ratio and effecting transfer from second speed ratio to third speed ratio so that smooth and gradual engagement of these speed ratios will be realized.

Another important feature is that the four variable forward speed ratios are successively completed by friction clutch and brake devices which allow the smooth shifting from one speed ratio to another, the successively operated devices overlapping in such manner as to yield continuous torque during ratio change interval which prevents torque shock.

It will be noted that the transmission, as a whole, has a minimum number of control elements, namely, only two friction clutches and three friction brakes being utilized for providing four forward speed ratios. By the utilization of two friction clutches to provide divided torque paths between the power-providing element 10 and the compound epicyclic gearing, the clutches may be compressed into a relatively small space and this feature, together with the fact that the gearing is composed of only two groups of simple planetary units, is of considerable importance in providing a compact transmission having dimensions which occupy less space than that required for a standard transmission affording similar speed ratios.

I wish it to be understood that my invention is not to be limited to the specific constructions and arrangement shown and described, except only insofar as the claim may be so limited, as it will be apparent to those skilled in the art that changes may be made without departing from the principles of the invention.

What is claimed is:

In a transmission, the combination of a drive shaft, a driven shaft, a compound planetary gear unit comprising a first planet gear set and a second planet gear set, each of said sets comprising a sun gear, a ring gear, a planet gear in mesh with the sun and ring gears and a planet gear carrier, the ring gear of said first set and the carrier of said second set being connected with said driven shaft for driving the shaft, the carrier of said first set being connected with the ring gear of said second set, means for providing a direct drive between said shafts and including a first friction clutch for connecting the sun gear of said first set with said drive shaft and a second friction clutch for connecting the carrier of said first set and the ring gear of said second set with said drive shaft which clutches when both are engaged lock the elements of said gear unit together so that they all rotate as a unit and provide the direct drive, a fluid pressure actuated piston for engaging each of said clutches, centrifugal valve means responsive to the speed of rotation of said drive shaft and varying the pressure applied to the piston for said first clutch according to drive shaft speed, fluid passage means for relieving the fluid pressure applied to the piston for said first clutch for selectively releasing and engaging the same when the centrifugal valve means are operative, means for providing low and intermediate reduced speed drives from said drive shaft to said driven shaft through said gear unit and including a friction brake for the sun gear of said second gear set which when it and said first clutch are engaged completes said low speed drive and when it and said second clutch are engaged with said first clutch disengaged completes said intermediate speed drive, means for providing an overdrive from said drive shaft to said driven shaft through said gear unit and including a friction brake for the sun gear of said first gear set which when it and said second clutch are engaged with said first clutch disengaged completes the overdrive, means for providing a reverse drive from said drive shaft to said driven shaft through said gear unit and comprising a friction brake for the carrier of said first set and the ring gear of said second set which when it and said first clutch are engaged completes the reverse drive, and a fluid pressure responsive means including a fluid actuated piston for engaging each of said brakes.

RICHARD L. SMIRL.

REFERENCES CITED

The following references are of record in the file of this patent:

UNITED STATES PATENTS

| Number | Name | Date |
| --- | --- | --- |
| 1,609,782 | Small et al. | Dec. 7, 1926 |
| 1,991,124 | Sharpe | Feb. 12, 1935 |
| 2,046,428 | Riley | July 7, 1936 |
| 2,143,321 | Kegresse | Jan. 10, 1939 |
| 2,163,202 | Kegresse | June 20, 1939 |
| 2,231,411 | Lawrence | Feb. 11, 1941 |
| 2,291,241 | Lawrence | July 28, 1942 |
| 2,319,549 | Lawrence | May 18, 1943 |
| 2,328,090 | Nutt et al. | Aug. 31, 1943 |
| 2,328,092 | Nutt et al. | Aug. 31, 1943 |
| 2,395,459 | Carnagua | Feb. 26, 1946 |
| 2,418,378 | Voytech | Apr. 1, 1947 |
| 2,440,589 | Kegresse | Apr. 27, 1948 |

FOREIGN PATENTS

| Number | Country | Date |
| --- | --- | --- |
| 469,881 | Great Britain | Aug. 3, 1937 |